(12) United States Patent
Bucking

(10) Patent No.: US 9,970,448 B2
(45) Date of Patent: May 15, 2018

(54) SWIRL INDUCING BEARING HOUSING SPACER AND CORE

(71) Applicant: BorgWarner Inc., Auburn Hills, MI (US)

(72) Inventor: Michael Bucking, Asheville, NC (US)

(73) Assignee: BorgWarner Inc., Auburn Hills, MI (US)

(*) Notice: Subject to any disclaimer, the term of this patent is extended or adjusted under 35 U.S.C. 154(b) by 240 days.

(21) Appl. No.: 14/439,276

(22) PCT Filed: Nov. 4, 2013

(86) PCT No.: PCT/US2013/068235
§ 371 (c)(1),
(2) Date: Apr. 29, 2015

(87) PCT Pub. No.: WO2014/074436
PCT Pub. Date: May 15, 2014

(65) Prior Publication Data
US 2015/0292517 A1    Oct. 15, 2015

Related U.S. Application Data

(60) Provisional application No. 61/725,131, filed on Nov. 12, 2012.

(51) Int. Cl.
F04D 29/05       (2006.01)
F04D 29/056      (2006.01)
(Continued)

(52) U.S. Cl.
CPC ........... F04D 29/056 (2013.01); F01D 25/16 (2013.01); F01D 25/18 (2013.01); F02C 6/12 (2013.01);
(Continued)

(58) Field of Classification Search
CPC .... F04D 29/05; F04D 29/056; F04D 29/0563; F01D 25/16; F01D 25/18; F02C 6/12; F16C 2360/24; F05D 2220/40
See application file for complete search history.

(56) References Cited

U.S. PATENT DOCUMENTS 4,358,253 A * 11/1982 Okano ................. F01D 25/166
                                                  384/368
4,902,144 A *  2/1990 Thoren ................. F01D 25/166
                                                  384/287
(Continued)

FOREIGN PATENT DOCUMENTS

EP          0395825        11/1990

*Primary Examiner* — Igor Kershteyn
*Assistant Examiner* — Brian P Wolcott
(74) *Attorney, Agent, or Firm* — Young Basile Hanlon & MacFarlane, P.C.

(57) ABSTRACT

A turbocharger (10) having a bearing housing (14) between a turbine housing and a compressor housing with a shaped core (16) forming an internal oil drain cavity (20) adjacent to a spacer (24) shaped to induce swirling for oil defoaming. A depression (18) in an internal core wall of the bearing housing (14) forms the oil drain cavity (20) with each end (22) of the depression (18) corresponding to a distal end (30) of the spacer (24). The spacer (24) is preferably substantially tubular with a row of oil-flow apertures (32) aligned on each outer span (34) of a recessed center portion (28) to induce swirling.

7 Claims, 5 Drawing Sheets

(51) Int. Cl.
*F01D 25/16* (2006.01)
*F01D 25/18* (2006.01)
*F02C 6/12* (2006.01)
*F16C 17/18* (2006.01)
*F16C 33/10* (2006.01)
*F16C 17/26* (2006.01)

(52) U.S. Cl.
CPC ......... F04D 29/05 (2013.01); F04D 29/0563 (2013.01); *F01D 25/166* (2013.01); *F16C 17/18* (2013.01); *F16C 17/26* (2013.01); *F16C 33/1025* (2013.01); *F16C 2360/24* (2013.01)

(56) References Cited

U.S. PATENT DOCUMENTS

| | | | |
|---|---|---|---|
| 5,066,192 A | 11/1991 | Honda et al. | |
| 7,461,979 B2 * | 12/2008 | Mavrosakis | F01D 25/16 384/462 |
| 7,766,550 B2 * | 8/2010 | Larue | F16C 27/02 384/119 |
| 2008/0098735 A1 | 5/2008 | Gutknecht | |
| 2009/0202343 A1 | 8/2009 | McKeirnan, Jr. | |

* cited by examiner

SWIRL INDUCING BEARING HOUSING SPACER AND CORE

CROSS-REFERENCE TO RELATED APPLICATION

This application claims priority to and all benefits of U.S. Provisional Application No. 61/725,131, filed on Nov. 12, 2012, and entitled "Swirl Inducing Bearing Housing Spacer And Core."

BACKGROUND OF THE INVENTION

Field of the Disclosure

This disclosure relates to components for turbochargers having a bearing housing between a turbine housing and a compressor housing. More particularly, this disclosure relates to a bearing housing having a shaped spacer and shaped core for inducing a swirling effect for defoaming oil.

Description of Related Art

Advantages of turbocharging include increased power output, lower fuel consumption and reduced pollutant emissions. The turbocharging of engines is no longer primarily seen from a high power performance perspective, but is rather viewed as a means of reducing fuel consumption and environmental pollution on account of lower carbon dioxide ($CO_2$) emissions. Currently, a primary reason for turbocharging is using exhaust gas energy to reduce fuel consumption and emissions. In turbocharged engines, combustion air is pre-compressed before being supplied to the engine. The engine aspirates the same volume of air-fuel mixture as a naturally aspirated engine, but due to the higher pressure, thus higher density, more air and fuel mass is supplied into a combustion chamber in a controlled manner. Consequently, more fuel can be burned, so that the engine's power output increases relative to the speed and swept volume.

In exhaust gas turbocharging, some of the exhaust gas energy, which would normally be wasted, is used to drive a turbine. The turbine includes a turbine wheel that is mounted on a shaft and is rotatably driven by exhaust gas flow. The turbocharger returns some of this normally wasted exhaust gas energy back into the engine, contributing to the engine's efficiency and saving fuel. A compressor, which is driven by the turbine, draws in filtered ambient air, compresses it, and then supplies it to the engine. The compressor includes a compressor impeller that is mounted on the same shaft so that rotation of the turbine wheel causes rotation of the compressor impeller.

Turbochargers typically include a turbine housing connected to the engine's exhaust manifold, a compressor housing connected to the engine's intake manifold, and a center bearing housing coupling the turbine and compressor housings together. The bearing housing encloses the rotating shaft.

In an example radial bearing system, the shaft turns with minimal friction on an oil film in floating radial bearings. For the turbocharger, the oil supply is fed from the engine. The bearing system is designed such that floating radial bearings, rotating at less than shaft speed, are situated between the stationary bearing housing and the rotating shaft. This allows these bearings to be adapted such that there is no metal contact between shaft and bearings at any operating speed. Besides the lubricating function, the oil film also has a damping function, which contributes to the stability of the shaft and turbine wheel assembly. The oil may also remove heat from the turbocharger as the oil drains through an oil drain to a crankcase of the engine.

A through bore in the bearing housing for the rotating shaft extends from a compressor end to a turbine end of the bearing housing. The bearing housing includes bearings disposed at least partially in the through bore of the bearing housing and a bearing spacer. The shaft is rotatably supported by the bearings and has a rotational axis coincident with a rotational axis of the turbine wheel and a rotational axis of the compressor impeller. The bearing housing includes oil passages to direct oil from an oil inlet to the bearings and a shaft oil path to direct oil from the oil inlet to the rotating shaft in a manner dependent on rotational position of the bearing spacer in the through bore of the bearing housing. The spacer as shown in FIGS. 1 and 2 includes a single line of large apertures, specifically four apertures, processing around the center of the tubular spacer in a cylindrical oil drain cavity.

A core of the bearing housing includes an oil drain cavity between the oil inlet and the oil drain. The lubricating oil flows into the turbocharger at a pressure of approximately four bars. As the oil drains off at lower pressure, the oil drain diameter is typically larger than the oil inlet. The oil flow through the bearing is usually vertical from top to bottom. The oil should be returned into the crankcase above the engine oil level. Any obstruction in the oil drain will result in back pressure in the bearing system.

This disclosure focuses on oil in the bearing housing of turbochargers that can become agitated and foamed by the internal moving parts of the turbocharger. Agitated foamed oil can be detrimental to the proper function of the bearing housing oil drain cavity. Foamed oil has difficulty draining from the oil drain and other negative effects on the engine.

SUMMARY

This disclosure provides for a bearing housing with a spacer shaped to induce swirl in combination with a specially shaped oil drain cavity as part of a bearing housing core adjacent to the shaped spacer. The oil drain cavity is formed by a portion of the core of the bearing housing adjacent to the shaped spacer. The shaped core forming the oil drain cavity and associated shaped spacer distribute high pressure oil more evenly.

The shaped spacer induces an improved swirling effect for better oil defoaming. In the spacer, oil flows through a series of apertures along the span of the inwardly recessed portion of the spacer causing less agitation. With the shaped oil drain cavity having a depression in the core wall in conjunction with the shaped spacer (in cartridge), an oil exit area is increased via the oil drain cavity to an oil drain for flow of defoamed and less agitated oil.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION OF THE EMBODIMENTS

A turbocharger 10 is generally known wherein a compressor impeller is rotatably driven via a shaft 12 by a turbine wheel. The shaft 12 passes through a bearing housing 14 between a turbine housing and a compressor housing.

Figure 5:
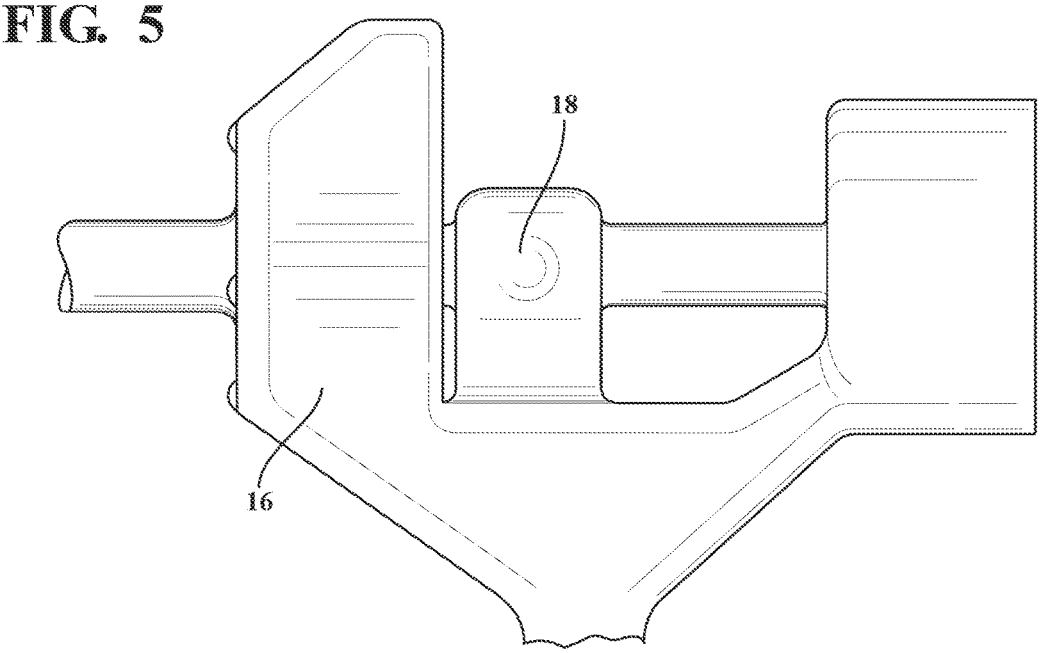
FIG. 5 is side view of the shaped core.
Figure 6:
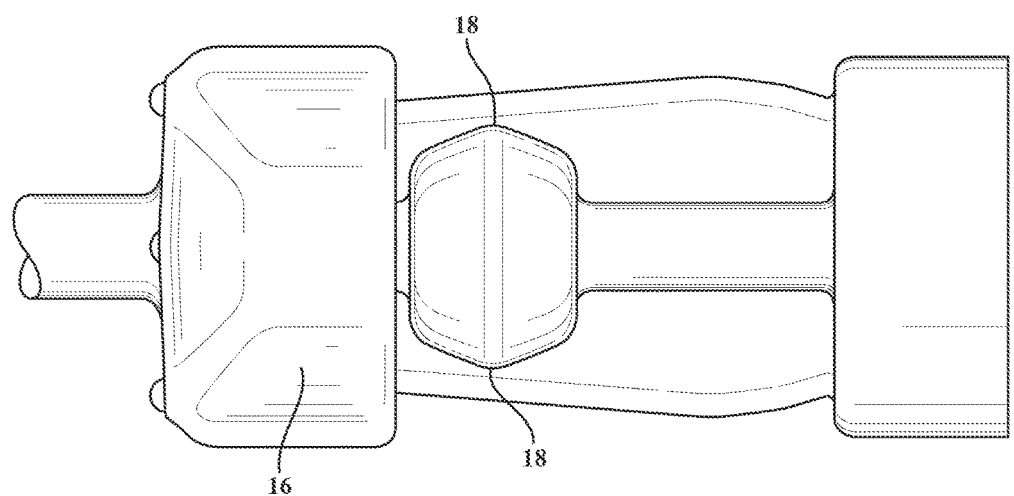
FIG. 6 is a top view of the shaped core showing a shaped depression of an oil drain cavity.
Figure 7:
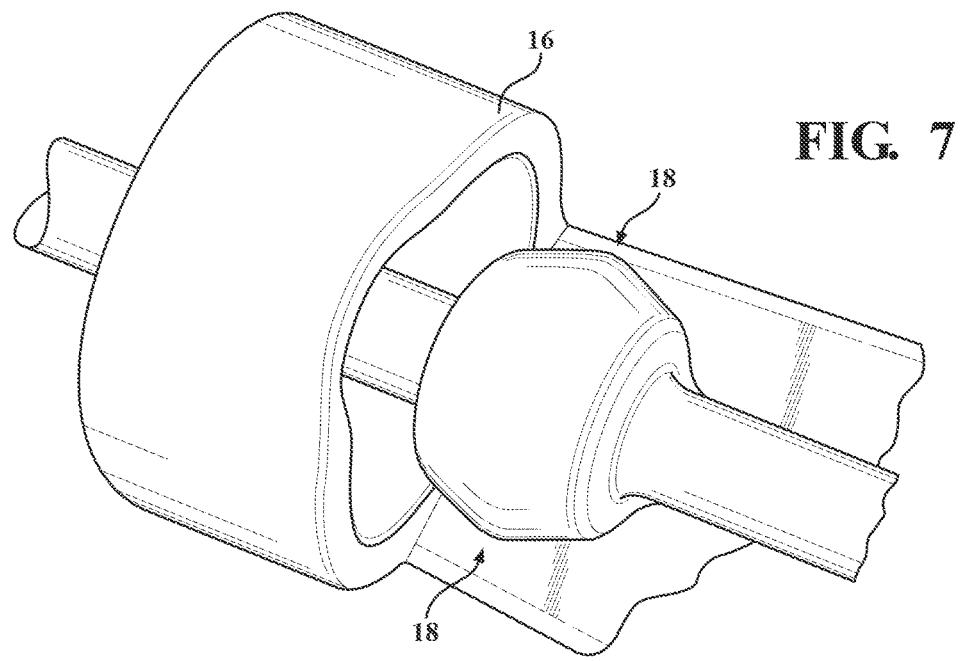
FIG. 7 is a perspective view of the shaped core.
Figure 8:
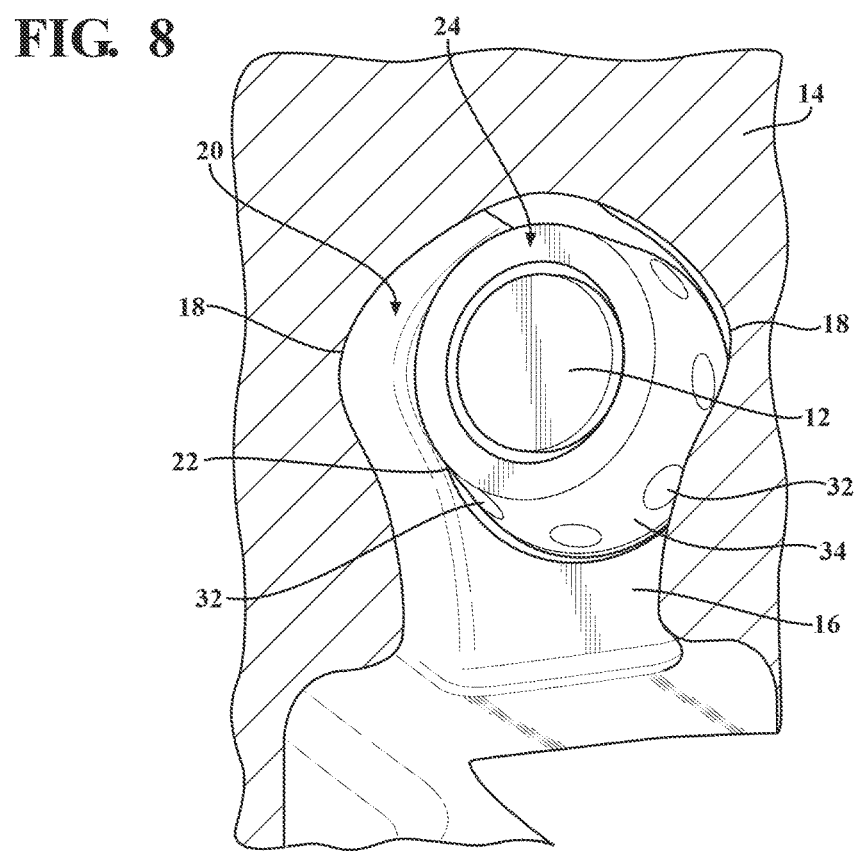
FIG. 8 is a cut-away perspective view of the shaped spacer in the oil drain cavity formed by depressions in the shaped core.
Figure 9:
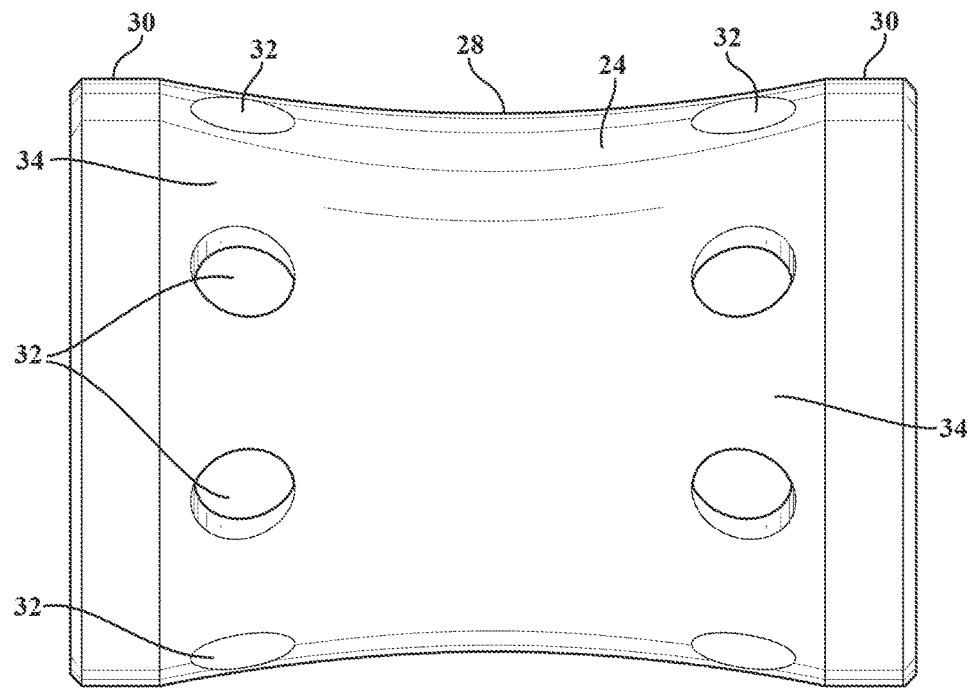
FIG. 9 is a side view of the shaped spacer.

The bearing housing 14 includes a core 16 as a hollow internal portion of the bearing housing 14 that encloses bearing components. The core 16 has a depression 18 or preferably a depression 18 on each side (i.e. right and left) in an internal bearing housing core wall forming an oil drain cavity 20, and each end 22 of the depression 18 preferably forms a substantially cylindrical core wall of a smaller diameter than the cross distance of the depressions 18 between the ends 22. The word "distance" is used as the span of the depression area is preferably not a circle. As shown in FIGS. 5, 6 and 8, the depression 18 on each side of a shaped spacer 24 may form an oil exit area of the oil drain cavity 20 extended on each side of the shaped spacer 24 with a smaller area above the shaped spacer 24 with an opening below to an oil drain 26.

The shaped spacer 24 encircles the shaft 12 and is disposed between a pair of bearings 27. The shaped spacer 24 is preferably substantially tubular with an inwardly recessed center portion 28 having a smaller diameter than the diameter of distal ends 30 of the shaped spacer 24. A row of oil-flow apertures 32 are aligned on each outer span 34 of the inwardly recessed center portion 28 between the distal ends 30. Each row of oil-flow apertures 32 preferably includes at least eight apertures aligned to induce swirling for oil defoaming.

Figure 3:
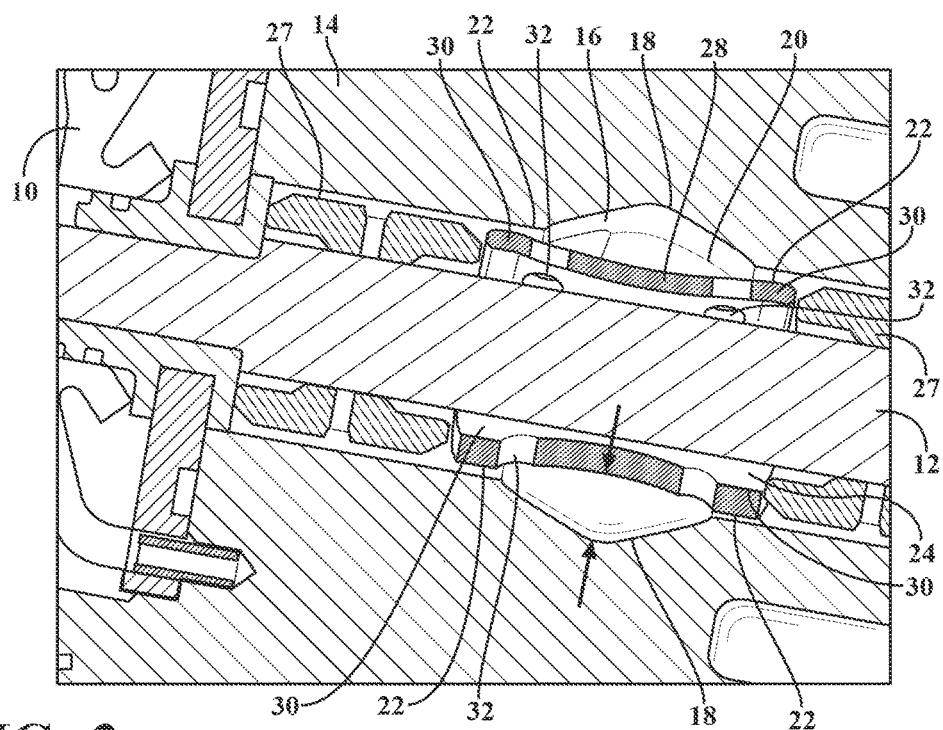
FIG. 3 is a top cross-sectional view of a bearing housing with a shaped core surrounding a shaped spacer.
Figure 4:
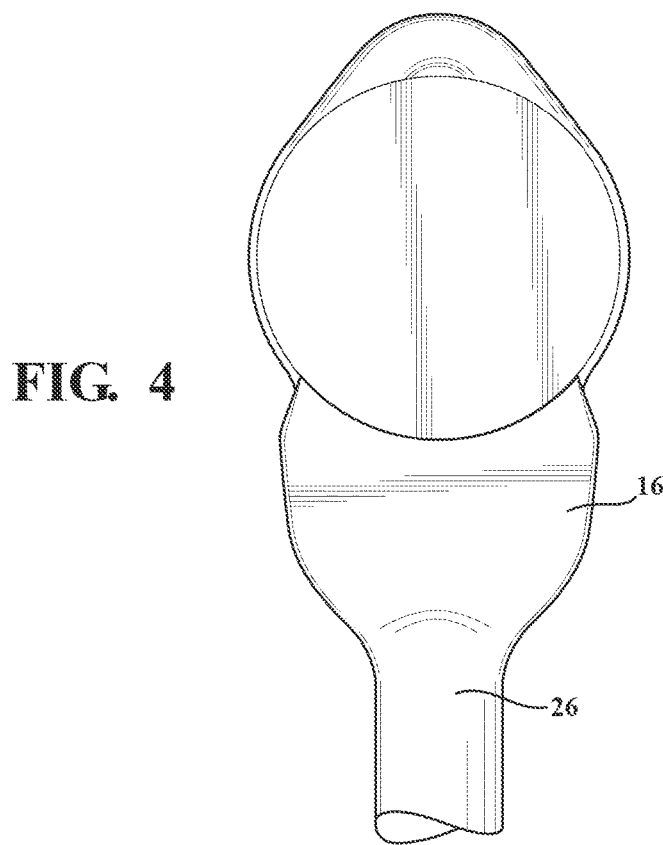
FIG. 4 is an end view of the shaped core.

The depression 18 forming the oil drain cavity 20 is adjacent to the shaped spacer 24. The depression 18 formed by the core 16 is generally U-shaped or V-shaped on each side and is situated in the bearing housing 14 to be adjacent to the inwardly recessed center portion 28 of the shaped spacer 24. The arrows on FIG. 3 show the larger oil exit area accommodated by the depressions 18 forming the oil drain cavity 20. While the figures show the depression 18 as a shallow "V" in FIG. 3 or "U" in FIG. 8, the shape of the oil drain cavity 20 is not limited to these preferred profiles.

Each end 22 of the depression 18 corresponds to the distal ends 30 of the shaped spacer 24 in close association. The distal ends 30 of the shaped spacer 24 are preferably cylindrical and aligned with corresponding round portions of the core 16 on each end of the inwardly recessed center portion 28 so that oil flows toward the inwardly recessed center portion 28. The distal ends 30 of the shaped spacer 24 align with each end 22 of the depression 18 in the bearing housing 14 in close association so oil primarily flows inwardly from the distal ends 30 of the shaped spacer 24.

Figure 1:
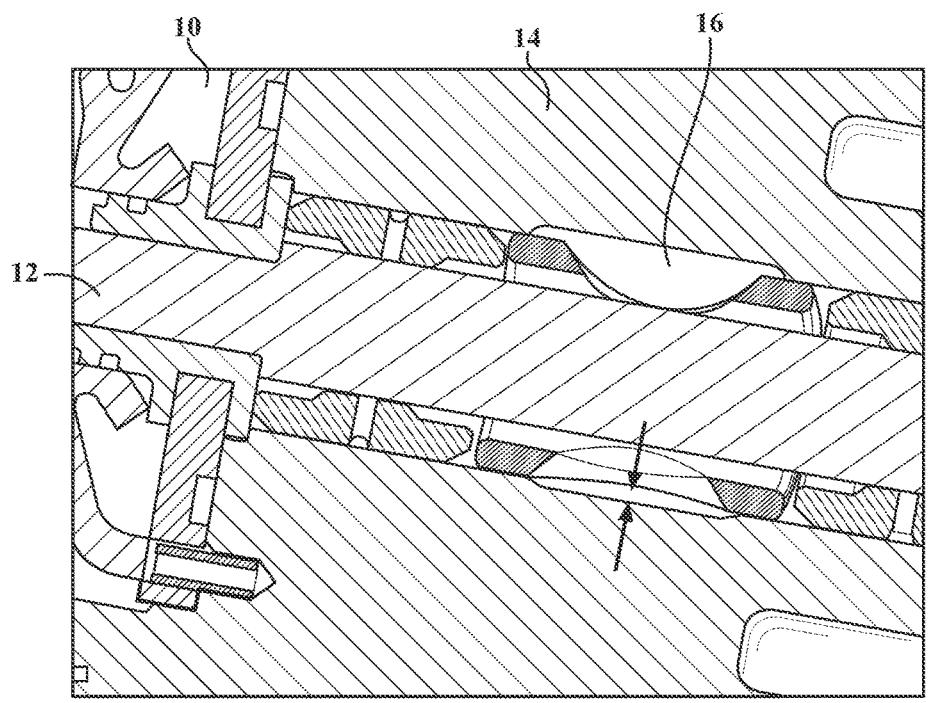
FIG. 1 is a top cross-sectional view of a prior art bearing housing with a substantially cylindrical core surrounding a spacer.
Figure 2:
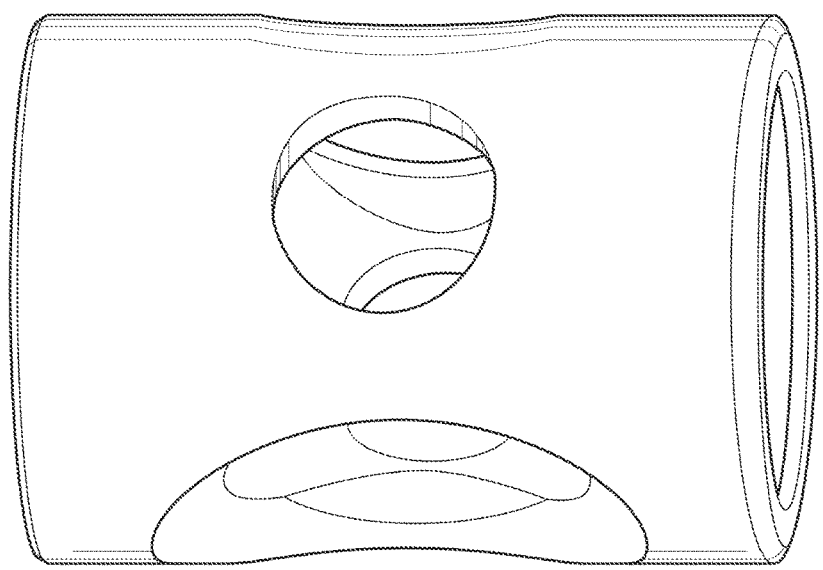
FIG. 2 is a prior art spacer having a single line of large apertures around a center of the spacer.
Figure 10:
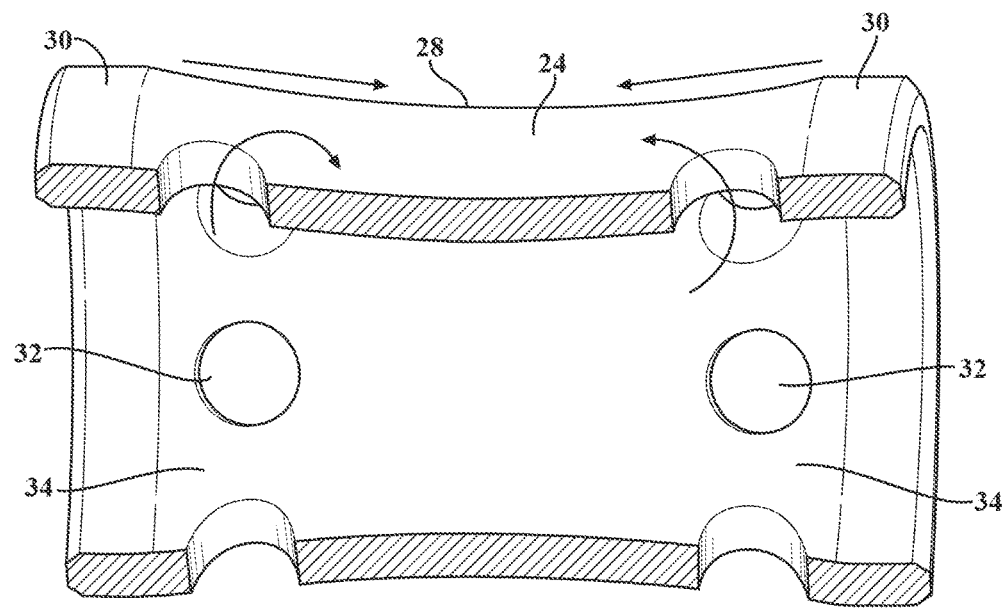
FIG. 10 is a cross-sectional view of the shaped spacer with noted oil flow directions.

FIG. 10 is a cross-sectional view of the shaped spacer 24 and shows oil flow directions through the oil-flow apertures 32 and inward toward the inwardly recessed center portion 28 of the shaped spacer 24. This spacer oil flow design causes less agitation than with the prior art oil exit area being small as shown by arrows of FIG. 1 with a cylindrical core wall in close association with the primarily cylindrical spacer of FIG. 2. The small chamber around the prior art cylindrical spacer with large center apertures of the prior art oil exit area often acts to agitate oil. The presently disclosed shaped core 16 with its preferred depression 18 on each side of the shaped spacer 24 distribute high pressure oil more evenly with less agitation and better flow in and from the oil drain cavity 20.

The core 16 allows flow of oil, and the oil drain cavity 20 is above the oil drain 26 for return of oil to an engine crankcase.

The invention has been described in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed is:

1. A turbocharger (10) comprising:
a bearing housing (14) with a core (16) having a depression (18) wherein diameters at ends (22) of the depression (18) are smaller than a diameter between the ends (22) of the depression (18) thereby forming an oil drain cavity (20) adjacent to a spacer (24) shaped to induce swirling for oil defoaming, wherein a diameter of a center portion (28) of the spacer (24) between the ends (22) of the depression (18) is smaller than diameters of distal ends (30) of the spacer (24).

2. The turbocharger (10) of claim 1 wherein the depression (18) is U-shaped in the bearing housing (14) adjacent to the center portion (28) of the spacer (24), and the ends (22) of the depression (18) correspond to the distal ends (30) of the spacer (24).

3. The turbocharger (10) of claim 1 wherein the spacer (24) is substantially tubular with the center portion (28) being inwardly recessed and having a row of oil-flow apertures (32) aligned on each outer span (34) of the center portion (28), wherein the rows of oil-flow apertures (32) are aligned with the ends (22) of the depression (18).

4. The turbocharger (10) of claim 3 wherein each row of oil-flow apertures (32) includes at least eight apertures.

5. The turbocharger (10) of claim 3 wherein the distal ends (30) of the spacer (24) are cylindrical and aligned with corresponding round wall portions of the core (16) so that oil flows toward the center portion (28).

6. The turbocharger (10) of claim 1 wherein the oil drain cavity (20) is above an oil drain (26) for return of oil to an engine crankcase.

7. A turbocharger (10) comprising:
a bearing housing (14) with a core (16) having a depression (18) in the bearing housing (14) wherein diameters at opposite ends (22) of the depression (18) are smaller than a diameter between the opposite ends (22) of the depression thereby forming an oil drain cavity (20) on each side of a substantially tubular spacer (24),
wherein the substantially tubular spacer (24) includes an inwardly recessed center portion (28) positioned between two rows of oil-flow apertures (32) aligned on each outer span (34) of the inwardly recessed center portion (28) to induce swirling for oil defoaming, wherein a diameter of the inwardly recessed center portion (28) is smaller than diameters of the outer spans (34), and wherein the distal ends (30) of the substantially tubular spacer (24) align with the opposite ends (22) of the depressions (18) in the bearing housing (14).

\* \* \* \* \*